United States Patent
Bratt et al.

(10) Patent No.: US 9,336,563 B2
(45) Date of Patent: May 10, 2016

(54) BUFFER UNDERRUN HANDLING

(71) Applicant: Apple Inc., Cupertino, CA (US)

(72) Inventors: Joseph P. Bratt, San Jose, CA (US); Peter F. Holland, Sunnyvale, CA (US); Shing Horng Choo, San Francisco, CA (US); Timothy J. Millet, Mountain View, CA (US); Brijesh Tripathi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 14/163,326

(22) Filed: Jan. 24, 2014

(65) Prior Publication Data

US 2014/0139535 A1 May 22, 2014

Related U.S. Application Data

(62) Division of application No. 12/685,171, filed on Jan. 11, 2010, now Pat. No. 8,675,004.

(51) Int. Cl.
*G09G 5/39* (2006.01)
*G06T 1/60* (2006.01)

(52) U.S. Cl.
CPC ... *G06T 1/60* (2013.01); *G09G 5/39* (2013.01)

(58) Field of Classification Search
CPC ............ G09G 2340/0435; G09G 5/18; H04N 7/0105; H04N 1/2137; G06T 1/60
See application file for complete search history.

(56) References Cited

U.S. PATENT DOCUMENTS

| | | | |
|---|---|---|---|
| 6,489,956 B1 | 12/2002 | Deering | |
| 6,496,186 B1 | 12/2002 | Deering | |
| 6,525,723 B1 | 2/2003 | Deering | |
| 7,202,870 B2 | 4/2007 | Chen et al. | |
| 2008/0165268 A1 | 7/2008 | Takahashi et al. | |
| 2010/0073388 A1* | 3/2010 | Mostinski | G09G 5/363 345/558 |

* cited by examiner

*Primary Examiner* — Hau Nguyen
(74) *Attorney, Agent, or Firm* — Meyertons, Hood, Kivlin, Kowert & Goetzel, P.C.; Lawrence J. Merkel

(57) ABSTRACT

A graphics system may include a display pipe with a buffer configured to store pixels to be processed by a display controller for displaying on a display device, with a buffer control circuit coupled to the buffer to supply pixels to the display controller. When the buffer control circuit detects an underrun of the buffer responsive to the display controller attempting to read pixels from the buffer that have not yet been written to the buffer, the buffer control circuit may supply an underrun pixel to the display. The underrun pixel may be selected from a set of previously stored set of underrun pixels, which may include a most recent valid pixel read by the display controller. A read pointer representative of the location in the buffer from where the display controller is currently attempting to read may be advanced even when an underrun condition occurs. The underrun pixel may be supplied to the display controller until the underrun has been resolved, at which point the most recent valid pixel read from the buffer may be supplied to the display controller.

20 Claims, 5 Drawing Sheets

BUFFER UNDERRUN HANDLING

PRIORITY INFORMATION

This application is a divisional of U.S. patent application Ser. No. 12/685,171, filed Jan. 11, 2010, which is incorporated by reference herein in its entirety.

BACKGROUND

1. Field of the Invention

This invention is related to the field of graphical information processing, more particularly, to reading and writing registers that store image frame descriptors.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" therefore often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size.

The frame buffers can be situated in memory elements dedicated to store image and video information, or they can be situated in the system memory. Consequently, system memory may be used to store a set of pixel data that defines an image and/or video stream for display on a display device. Applications running in such a system can write the pixel data into the system memory, from where the pixel data may be obtained by a graphics processing system to generate a set of image/video signals for generating the image on the display device. Typically, the image/video signals are generated through a display controller, which can be set up to receive the image/video pixels from the graphics processing system. While under normal circumstances the image/video pixels are provided to the display controller at a sufficiently high rate to continuously display the current (expected) image/video frame, there may be cases when, for a variety of reasons, the pixels expected by the display controller are not yet available to the display controller. It is helpful to have some mechanism in place to handle such cases in order to maintain uninterrupted display of image/video information.

SUMMARY

In one set of embodiments, the display pipe in a graphics system may feature an output buffer for storing pixels, which may be continuously read by a display controller for displaying on a display device. If the display controller pops pixels from the output buffer before those pixels are written by the display pipe, then a buffer underrun occurs. The output buffer may increment the read pointer for each underrun pop, so that when the display pipe catches up, the correct pixels will be displayed after the underrun is corrected. Various modes may be supported for the underrun pixels. A first mode may include outputting the most recent valid pixel, which may provide a "closest to correct" solution that may minimize the visual effect of the underrun. A second mode may include outputting a "stuck pixel" (which may be programmed) for the underrun pixels, which may be useful for debug as the underrun pixels may be visually obvious. A third mode may include outputting the stuck pixels for the rest of the current frame, even if the underrun is eventually corrected. A fourth mode may include outputting the stuck pixel for the rest of the frames, even if the underrun is eventually corrected.

In one set of embodiments, a display pipe may include a buffer configured to store pixels to be displayed by a display controller, and a buffer control circuit coupled to the buffer. The buffer control circuit may detect an underrun of the buffer responsive to the display controller attempting to read pixels from the buffer that have not yet been written to the buffer, and supply an underrun pixel to the display controller in response to detecting the underrun. In one embodiment, the underrun pixel is a most recent valid pixel read by the display controller. The buffer control circuit may include a register to store the underrun pixel, and may further include selection logic coupled the register, to selectively provide to the display controller a most recently read pixel from the buffer, except when an underrun is detected, in which case the selection logic may provide the underrun pixel to the display controller. The register may store the most recently read valid pixel as the underrun pixel, or it may store a pixel loaded from memory to serve as the underrun pixel.

In another set of embodiments, a graphics system may include an output buffer configured to store pixels to be displayed on a display device, and a processing unit configured to write the pixels into the output buffer at a first clock rate. The graphics system may also include a display controller to read the pixels from the output buffer at a second clock rate different from the first clock rate, and a control element for detecting when the display controller is attempting to read from a location in the output buffer that does not contain a valid pixel. When that happens, the control element may cause a specified pixel to be supplied to the display controller from a location other than the location in the output buffer from where the display controller was attempting to read. In one embodiment, the processing unit writes the pixels into the output buffer in a specified order, and the display controller reads the pixels from the output buffer in the same specified order in which the pixels were written into the output buffer. A location in the output buffer may be said to not contain a valid pixel, if the display controller is attempting to read from that location before the processing unit has written that location according to the specified order.

In one set of embodiments, the control element may track a read pointer pointing to a current read location in the output buffer from where the display controller is attempting to read, and may also track a write pointer pointing to a current write location of the output buffer that the processing unit is attempting to write. The control element may compare the value of the read pointer with the value of the write pointer to detect when the display controller is attempting to read from a location in the output buffer that does not contain a valid pixel. The graphics system may continue to move the read pointer forward even in the event the control element has detected that the display controller is attempting to read from a location in the output buffer that does not contain a valid pixel. The control element may also cause the specified pixel to be supplied to the display controller until the display controller is attempting to read from a location in the output buffer that contains a valid pixel, at which point the control element may allow the valid pixel to be read and provided to the display controller.

BRIEF DESCRIPTION OF THE DRAWINGS

The following detailed description makes reference to the accompanying drawings, which are now briefly described.

Figure 1:
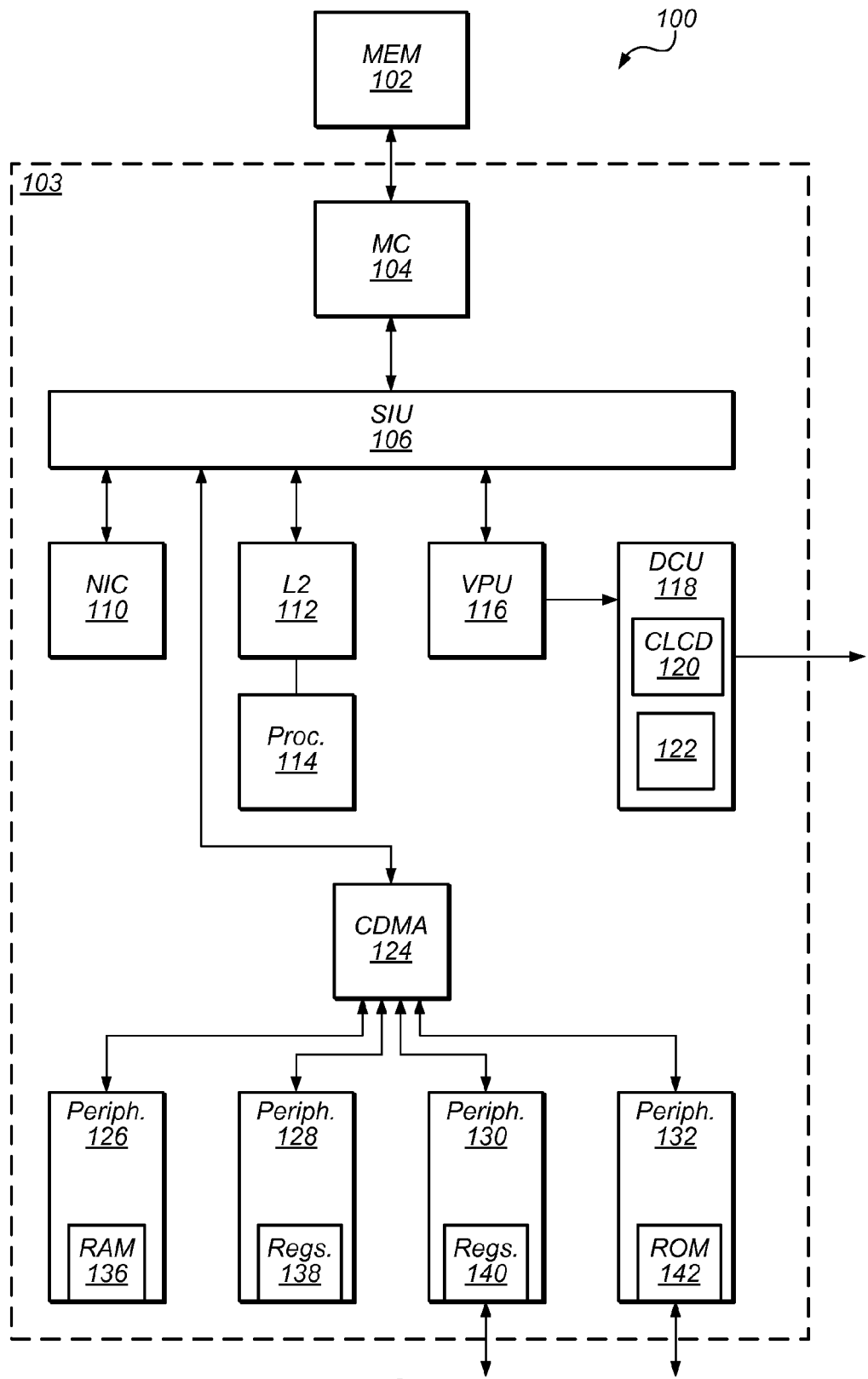
FIG. 1 is a block diagram of one embodiment of an integrated circuit that include a graphics display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 100 that includes an integrated circuit 103 coupled to external memory 102 is shown. In the illustrated embodiment, integrated circuit 103 includes a memory controller 104, a system interface unit (SIU) 106, a set of peripheral components such as components 126-128, a central DMA (CDMA) controller 124, a network interface controller (NIC) 110, a processor 114 with a level 2 (L2) cache 112, and a video processing unit (VPU) 116 coupled to a display control unit (DCU) 118. One or more of the peripheral components may include memories, such as random access memory (RAM) 136 in peripheral component 126 and read-only memory (ROM) 142 in peripheral component 132. One or more peripheral components 126-132 may also include registers (e.g. registers 138 in peripheral component 128 and registers 140 in peripheral component 130 in FIG. 1). Memory controller 104 is coupled to a memory interface, which may couple to memory 102, and is also coupled to SIU 106. CDMA controller 124, and L2 cache 112 are also coupled to SIU 106 in the illustrated embodiment. L2 cache 112 is coupled to processor 114, and CDMA controller 124 is coupled to peripheral components 126-132. One or more peripheral components 126-132, such as peripheral components 140 and 142, may be coupled to external interfaces as well.

SIU 106 may be an interconnect over which the memory controller 104, peripheral components NIC 110 and VPU 116, processor 114 (through L2 cache 112), L2 cache 112, and CDMA controller 124 may communicate. SIU 106 may implement any type of interconnect (e.g. a bus, a packet interface, point to point links, etc.). SIU 106 may be a hierarchy of interconnects, in some embodiments. CDMA controller 124 may be configured to perform DMA operations between memory 102 and/or various peripheral components 126-132. NIC 110 and VPU 116 may be coupled to SIU 106 directly and may perform their own data transfers to/from memory 102, as needed. NIC 110 and VPU 116 may include their own DMA controllers, for example. In other embodiments, NIC 110 and VPU 116 may also perform transfers through CDMA controller 124. Various embodiments may include any number of peripheral components coupled through the CDMA controller 124 and/or directly to the SIU 106. DCU 118 may include a display control unit (CLDC) 120 and buffers/registers 122. CLDC 120 may provide image/video data to a display, such as a liquid crystal display (LCD), for example. DCU 118 may receive the image/video data from VPU 116, which may obtain image/video frame information from memory 102 as required, to produce the image/video data for display, provided to DCU 118.

Processor 114 (and more particularly, instructions executed by processor 114) may program CDMA controller 124 to perform DMA operations. Various embodiments may program CDMA controller 124 in various ways. For example, DMA descriptors may be written to the memory 102, describing the DMA operations to be performed, and CDMA controller 124 may include registers that are programmable to locate the DMA descriptors in the memory 102. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 124 may include registers that are programmable to describe the DMA operations to be performed, and programming the CDMA controller 124 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 102), or may be an internal memory in the integrated circuit 103, in some embodiments. For example, a peripheral component 126-132 may include a memory that may be a source or target. In the illustrated embodiment, peripheral component 132 includes the ROM 142 that may be a source of a DMA operation. Some DMA operations may have memory as a source and a target (e.g. a first memory region in memory 102 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, peripheral components 130 and 132 may be coupled to interfaces onto which DMA data is to be transferred or on which the DMA data is to be received.

CDMA controller 124 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, CDMA controller 124 may be configured to perform the transfers concurrently. For example, CDMA controller 124 may alternate reading portions of the data from the source of each DMA operation and writing the portions to the targets. CDMA controller 124 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

CDMA controller 124 may include buffers to store data that is being transferred from a source to a destination, although the buffers may only be used for transitory storage. Thus, a DMA operation may include CDMA controller 124 reading data from the source and writing data to the destination. The data may thus flow through the CDMA controller 124 as part of the DMA operation. Particularly, DMA data for a DMA read from memory 124 may flow through memory controller 104, over SIU 106, through CDMA controller 124, to peripheral components 126-132, NIC 110, and VPU 116 (and possibly on the interface to which the peripheral component is coupled, if applicable). Data for a DMA write to memory may flow in the opposite direction. DMA read/write operations to internal memories may flow from peripheral components 126-132, NIC 110, and VPU 116 over SIU 106 as needed, through CDMA controller 124, to the other peripheral components (including NIC 110 and VPU 116) that may be involved in the DMA operation.

In one embodiment, instructions executed by the processor 114 may also communicate with one or more of peripheral components 126-132, NIC 110, VPU 116, and/or the various memories such as memory 102, or ROM 142 using read and/or write operations referred to as programmed input/output (PIO) operations. The PIO operations may have an address that is mapped by integrated circuit 103 to a peripheral component 126-132, NIC 110, or VPU 116 (and more particularly, to a register or other readable/writeable resource, such as ROM 142 or Registers 138 in the component, for example). It should also be noted, that while not explicitly shown in FIG. 1, NIC 110 and VPU 116 may also include registers or other readable/writeable resources which may be involved in PIO operations. PIO operations directed to memory 102 may have an address that is mapped by integrated circuit 103 to memory 102. Alternatively, the PIO operation may be transmitted by processor 114 in a fashion that is distinguishable from memory read/write operations (e.g. using a different command encoding then memory read/write operations on SIU 106, using a sideband signal or control signal to indicate memory vs. PIO, etc.). The PIO transmission may still include the address, which may identify the peripheral component 126-132, NIC 110, or VPU 116 (and the addressed resource) or memory 102 within a PIO address space, for such implementations.

In one embodiment, PIO operations may use the same interconnect as CDMA controller 124, and may flow through CDMA controller 124, for peripheral components that are coupled to CDMA controller 124. Thus, a PIO operation may be issued by processor 114 onto SIU 106 (through L2 cache 112, in this embodiment), to CDMA controller 124, and to the targeted peripheral component. Alternatively, the peripheral components 126-132 may be coupled to SIU 106 (much like NIC 110 and VPU 116) for PIO communications. PIO operations to peripheral components 126-132 may flow to the components directly from SIU 106 (i.e. not through CDMA controller 124) in one embodiment.

Generally, a peripheral component may comprise any desired circuitry to be included on integrated circuit 103 with the processor. A peripheral component may have a defined functionality and interface by which other components of integrated circuit 103 may communicate with the peripheral component. For example, a peripheral component such as VPU 116 may include video components such as a display pipe, which may include graphics processors, and a peripheral such as DCU 118 may include other video components such as display controller circuitry. NIC 110 may include networking components such as an Ethernet media access controller (MAC) or a wireless fidelity (WiFi) controller. Other peripherals may include audio components such as digital signal processors, mixers, etc., controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 126-132, NIC 110 and VPU 116 may include registers (e.g. registers 138-140 as shown, but also registers, not shown, in NIC 110 and/or within VPU 116) that may be addressable via PIO operations. The registers may include configuration registers that configure programmable options of the peripheral components (e.g. programmable options for video and image processing in VPU 116), status registers that may be read to indicate status of the peripheral components, etc. Similarly, peripheral components may include memories such as ROM 142. ROMs may store data used by the peripheral that does not change, code to be executed by an embedded processor within the peripheral component 126-132, etc.

Memory controller 104 may be configured to receive memory requests from system interface unit 106. Memory controller 104 may be configured to access memory to complete the requests (writing received data to the memory for a write request, or providing data from memory 102 in response to a read request) using the interface defined the attached memory 102. Memory controller 104 may be configured to interface with any type of memory 102, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
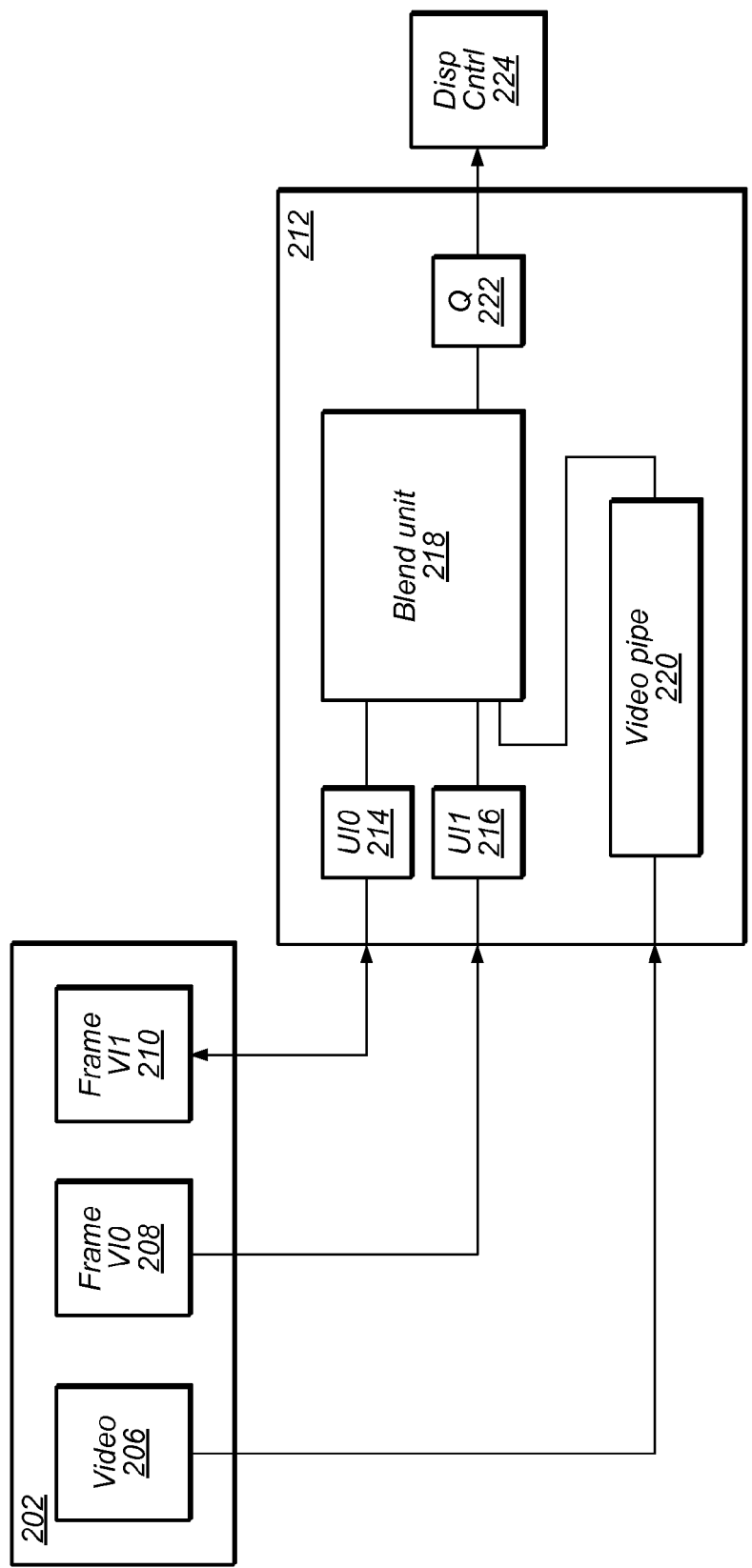
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. UI 214 and 216, and video pipe 220 may respectively provide the fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define frame parameters such as base address, frame size, active regions of frames, and other parameters for the frames that may be stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
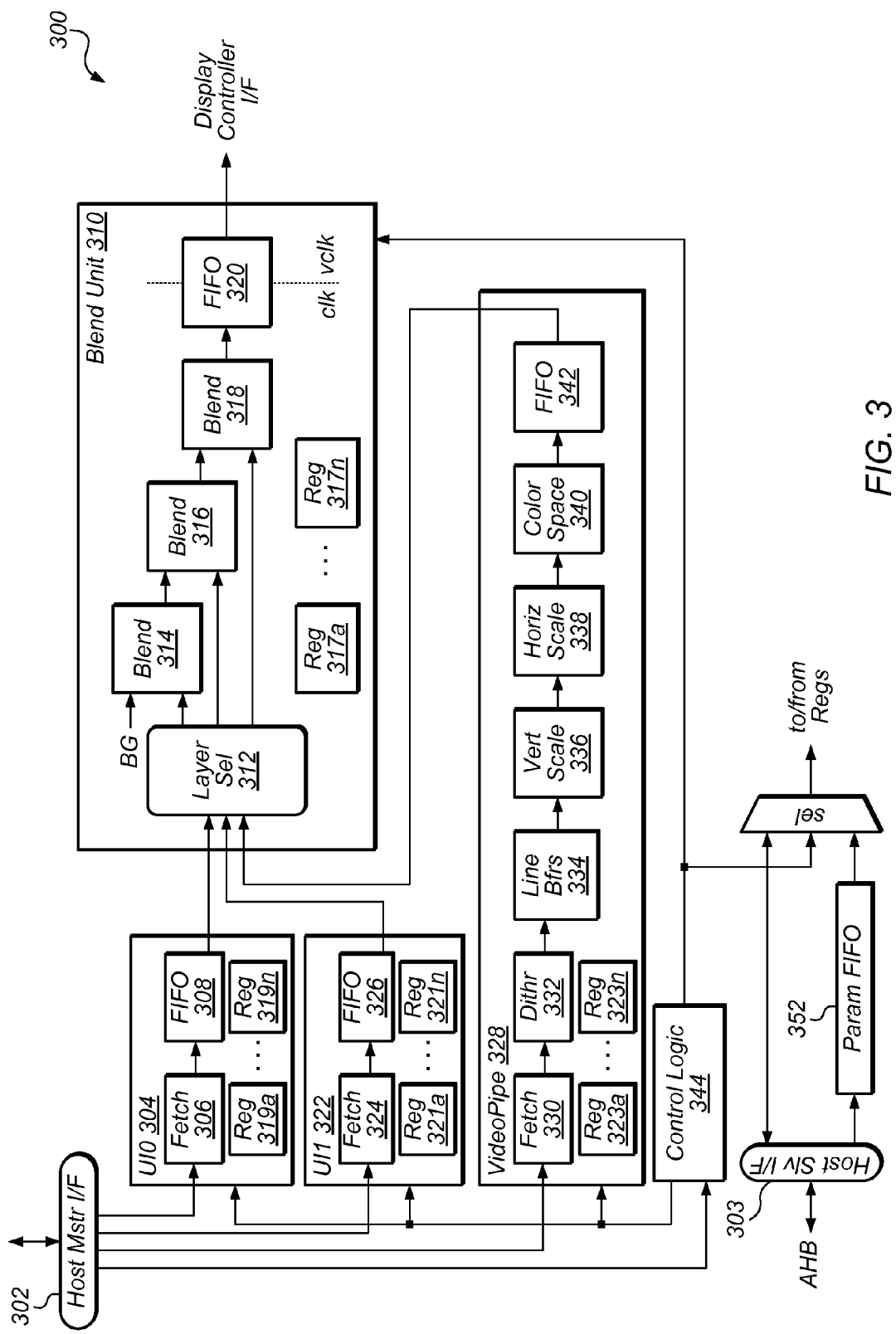
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data may be dithered, scaled, converted to RGB color space, and blended with up to a specified number (e.g. 2) RGB graphics (user interface) planes. Display pipe 300 may run in its own clock domain, and may provide an asynchronous interface to the display controllers to support displays of different sizes and timing requirements. Display pipe 300 may consist of one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319*a*-319*n* and 321*a*-321*n*, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. In one set of embodiments, fetch units 306 and 324 may only fetch those pixels of any given frame that are within the active region of the given frame, as defined by the contents of registers 319a-319n and 321a-321n. In other embodiments, fetch units 306 and 324 may fetch all the pixels, depending on the system configuration. The fetched pixels may be fed to respective FIFO buffers 308 and 326, from which the UI units may provide the fetched pixels to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD.

Blend unit 310 may be situated at the backend of display pipe 300 as shown in FIG. 3. It may receive frames of pixels from UI 304 and 322, and video pipe 328, and may blend them together layer by layer using blend units 314-318 and layer select unit 312. The final resultant pixels (which may be RGB of 10-bits each, in one embodiment) may be written into output FIFO 320 at the video pipe's clock rate of clk, and fetched by a display controller at the display controller's clock rate of vclk. In other words, output FIFO 320 may be filled with pixels (for a currently processed frame, which may be part of a succession of frames for a specified number of frames displayed per second) at a rate defined by clk, and read by the display controller (not specifically shown in FIG. 3, though exemplified by DCU 118 in FIG. 1) at a rate defined by vclk, which may be associated with the refresh rate of the display device controlled by the display controller. For example, vclk may be determined by the dimensions of the display frame (number of pixels horizontally and number of pixels vertically), and the frame rate at which frames are displayed on the display device (number of frames displayed per second).

Figure 4:
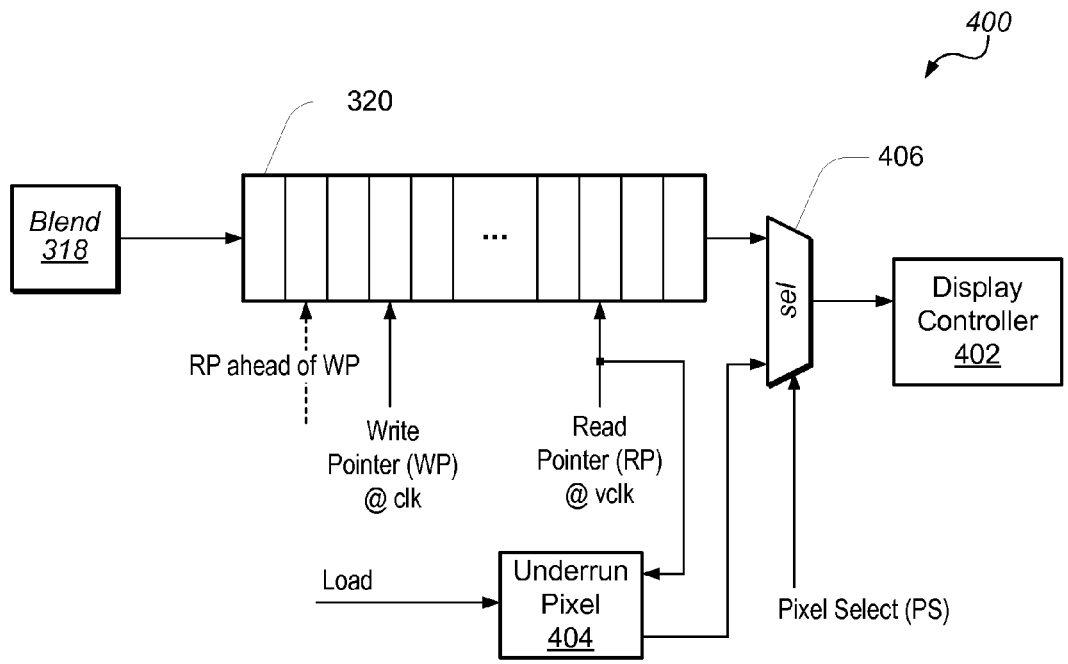
FIG. 4 is a partial block diagram illustrating operation of an output FIFO with buffer underrun handling, according to one embodiment.

FIG. 4 shows a partial block diagram of one embodiment of how output FIFO 320 may be filled with pixels from final Blend unit 318 (in the blend unit chain shown in FIG. 3), and the pixels read from output FIFO 320 by display controller 402. As shown in FIG. 4, each vertical partition in output FIFO 320 may represent a pixel. A write pointer (WP) may point to the location in output FIFO 320 that is currently being filled (or written) with a pixel, at a rate defined by clk, which may be (corresponding to) a system clock, for example a clock that synchronizes operation of display pipe 300. A read pointer (RP) may point to the location in output FIFO 320 from where a pixel is currently being read by the display controller, at a rate defined by vclk, which may be (corresponding to) a refresh rate of the display device, as previously discussed. Under certain circumstances, the position of RP may overtake the position of WP, and RP may be pointing to a location in output FIFO 320 that has not yet been written with the new pixel value expected by display controller 402. In other words, a situation may arise when, for a brief period of time, display controller may be reading pixels from output FIFO 320 faster than output FIFO 320 is filled with new pixel information, resulting in a buffer underrun.

In one set of embodiments, the buffer underrun may be handled by always capturing a last read valid pixel, (in other words, a most recently read valid pixel), and storing it in a memory module (e.g. a register) 404, from where it may be provided to display controller 402 to be displayed until the next valid pixel is made available to display controller 402. That is, the underrun pixel may be provided to display controller 402 until WP is again ahead of RP, ensuring that display controller has access to a current valid pixel. It should be noted that as used herein, "valid pixel" refers to a pixel at a location in output FIFO 320 that was expected to be written and has been written before the RP points to that location. It should also be noted that in the diagram show in FIG. 4, the RP and WP are shown to illustrate the traversal of output FIFO 320, while the connections between output FIFO 320 and blend unit 318, and between output FIFO 320 and multiplexer 406 are indicative of the interconnectivity of those logical blocks. The actual position of the pixel provided to multiplexer 406 is at the location being read at RP, and the actual position of the pixel being written to output FIFO 320 is at the location being written at WP. Consequently, the pixel stored in register 404 is also the same pixel as the pixel being read at the location of RP in output FIFO 320. When the read pixel provided to multiplexer 406 is not a valid pixel, that is, when RP is ahead of WP, as indicated by the dashed arrow in FIG. 4, instead of the output of output FIFO 320, the output from register 404 is selected by Pixel Select (PS) signal at multiplexer 406. In one embodiment, PS may be generated by control logic 344, included in display pipe 300.

In some embodiments, register 404 may also be loaded with a specified pixel value from memory, which may be used during certain test cases for example, or possibly during debug. This is indicated in FIG. 4 by the Load line into register 404. In one set of embodiments, RP may be continually incremented (advanced) according to vclk even in the event of a buffer underrun, while the pixel obtained from register 404 is provided to display controller 402. When the RP is again behind the WP, PS may again select the read pixel and provide it to display controller 402. In most cases the last read pixel may contain pixel information close enough to the pixel information of subsequent expected pixels that it may be displayed in the event of a buffer underrun without producing an unwanted, visually jarring effect on the overall appearance of the displayed frame. Most typically, the WP will catch up with the RP within a brief enough time period that the visual integrity of the displayed frame will not be compromised.

Figure 5:
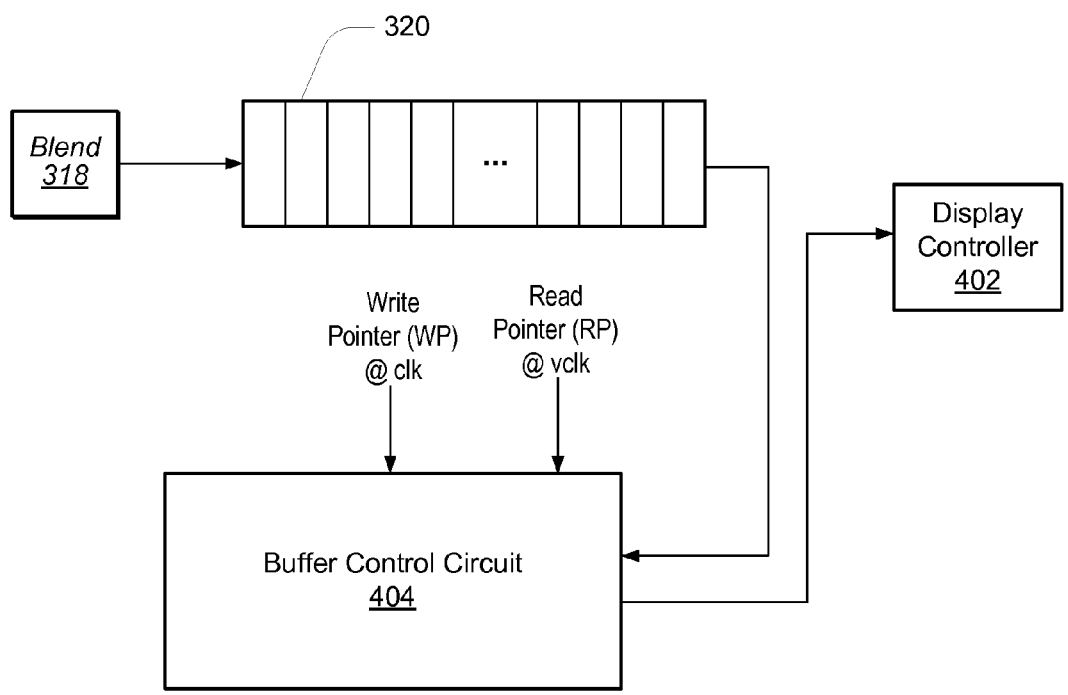
FIG. 5 is a partial block diagram illustrating one embodiment of an output FIFO configuration that handles buffer underruns.

FIG. 5 shows one embodiment of an output buffer configuration, in which a proxy pixel (also referred to as an underrun pixel), that is, the pixel to be displayed while the WP catches up with the RP, may be selected from a variety of different pixels depending on the given application or requirement. A buffer control circuit 404 may detect an underrun of output FIFO 320 responsive to display controller 402 attempting to read pixels from output FIFO 320 that have not yet been written to output FIFO 320, by tracking the RP and the WP, detecting the underrun based on the relative positions (values) of the RP and the WP. In response to detecting the underrun, buffer control circuit 404 may supply an underrun pixel to display controller 402. For example, instead of a single last read pixel stored in register 404 (as shown in FIG. 4), multiple pixels may be stored in, or may be accessible by buffer control circuit 404, which may select which of those pixels is to be displayed until the buffer underrun has been resolved. The RP may be continually incremented, and the read pixels may again be provided to display controller by buffer control circuit 404 once the buffer underrun has been resolved.

Figure 6:
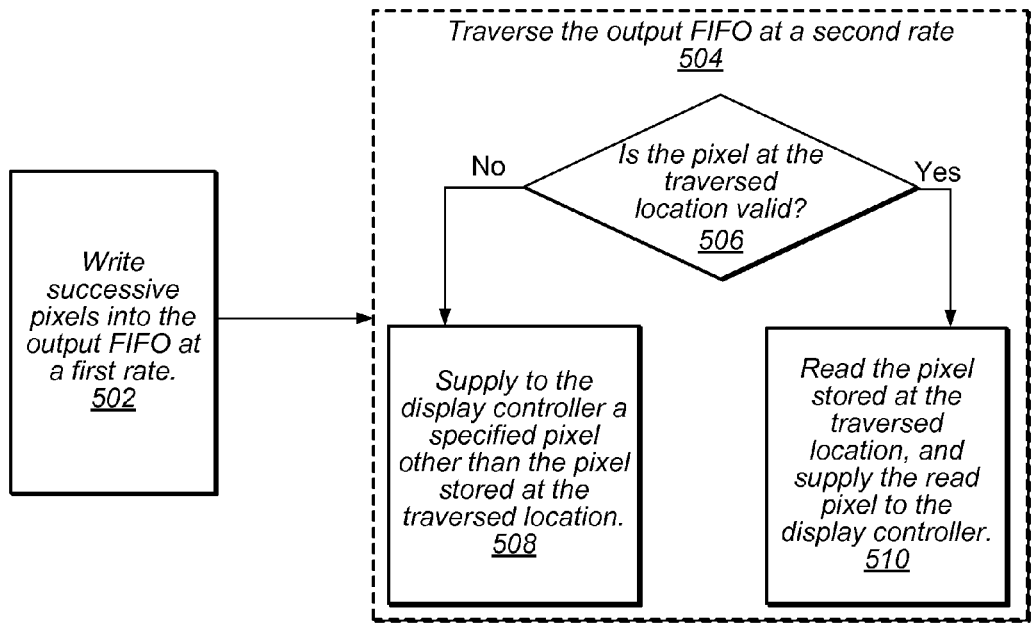
FIG. 6 is flow diagram illustrating how buffer underrun is handled in a display pipe output FIFO, according to one embodiment.

FIG. 6 shows a flow diagram illustrating how buffer underrun may be handled in a display pipe output FIFO (e.g. output FIFO 320 in FIG. 3), according to one embodiment. Successive pixels may be written into the output FIFO at a first rate that may correspond to an operating clock of the display pipe (502). The output FIFO may be traversed at a second rate that may correspond to a refresh rate of the display device on which the successive pixels are to be displayed (504). While traversing the output FIFO, for each traversed location, it may be determined whether the pixel stored at the traversed location is a valid pixel or an invalid pixel (506). In the case the pixel stored at the traversed location is determined to be valid (506—Yes), the pixel stored at the traversed location may be read and supplied to a display controller (510), which may display the supplied pixel on the display device. In case the pixel stored at the traversed location is determined to be invalid (506—No), a specified pixel other than the pixel stored at the traversed location may be supplied to the display controller (508), which may display the supplied pixel on the display device. In one set of embodiments, traversal of the output FIFO (i.e. 504) may be performed uninterrupted, even when it is determined that the pixel stored at the traversed location is an invalid pixel. In one embodiment, a pixel stored at the traversed location may be considered an invalid pixel when the traversed location has not been overwritten prior to being traversed.

Figure 7:
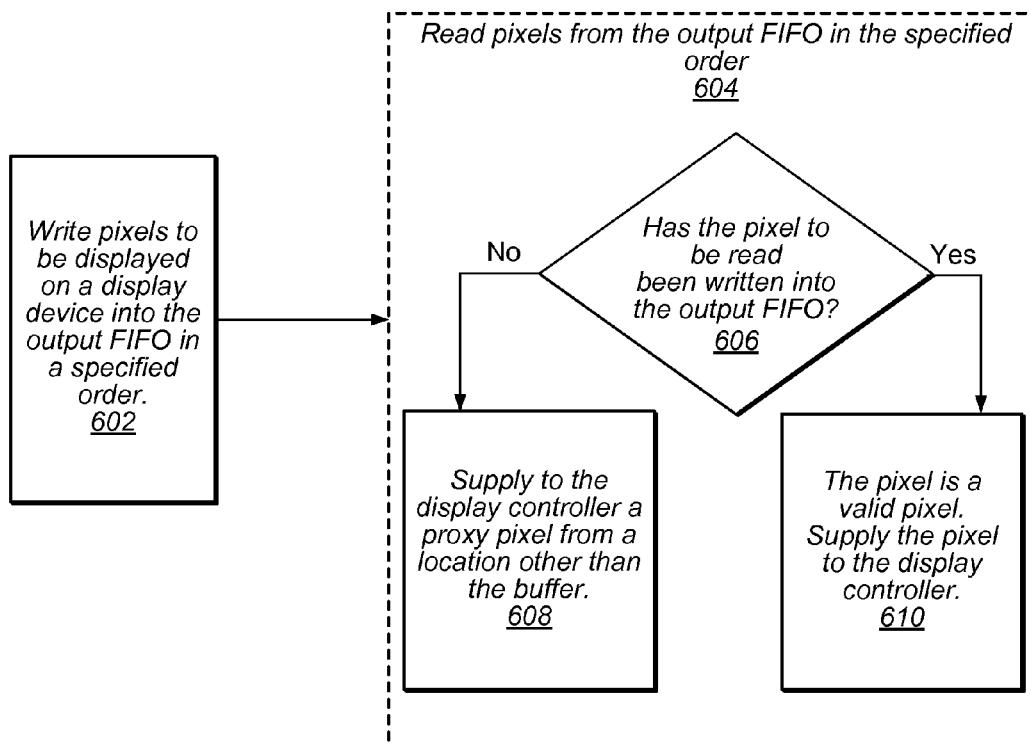
FIG. 7 is a flow diagram illustrating how buffer underrun is handled in a display pipe output FIFO, according to another embodiment.

FIG. 7 shows a flow diagram illustrating how buffer underrun may be handled in a display pipe output FIFO (e.g. output FIFO 320 in FIG. 3), according to a different embodiment. 6. Pixels to be displayed on a display device may be written into the output FIFO in a specified order (602). The pixels may be read from the output FIFO in the specified order the pixels were written into the output FIFO (604), determining whether there is an attempt to read a pixel that has not yet been written into the output FIFO (606). If there is an attempt to read a pixel that has not yet been written into the output FIFO (606—No), a proxy pixel may be supplied to a display controller from a location other than the buffer (608), for the display controller to display the supplied pixel (in this case the proxy pixel) on the display device. If the pixel to be read has previously been written into the output FIFO (606—Yes), the pixel may be considered valid and may be supplied to display controller (610) for displaying the supplied pixel (in this case the read pixel) on the display device. In one set of embodiments, the proxy pixel may be selected from a number of different available proxy pixels. Furthermore, the proxy pixel may be continuously supplied to the display controller until a valid pixel is read from the output FIFO, at which point the valid pixel may be supplied to the display controller.

Numerous variations and modifications will become apparent to those skilled in the art once the above disclosure is fully appreciated. It is intended that the following claims be interpreted to embrace all such variations and modifications.

What is claimed is:

1. A display pipe comprising:
a buffer configured to store pixels to be displayed on a display device by a display controller; and
a buffer control circuit coupled to the buffer, and configured to:
detect an underrun of the buffer in response to a position of a read pointer to the buffer overtaking a position of a write pointer to the buffer, wherein the position of the read pointer overtaking the position of the write pointer comprises the read pointer pointing to a location in the buffer that has not yet been written with a new pixel value expected by the display controller, wherein the read pointer points to a location in the buffer from where a pixel is currently being read and the write pointer points to a location in the buffer that is currently being filled; and
supply an underrun pixel to the display controller from a location other than the location in the buffer, in response to detecting the underrun.

2. The display pipe of claim 1, wherein the underrun pixel is a most recent valid pixel read by the display controller.

3. The display pipe of claim 1, wherein the buffer control circuit comprises:
a register configured to store the underrun pixel; and
selection logic coupled the register, and configured to selectively provide to the display controller:
a most recently read pixel from the buffer, except when the underrun is detected; and
the underrun pixel when an underrun is detected.

4. The display pipe of claim 3, wherein the register is coupled to the buffer, and is configured to store a most recently read valid pixel as the underrun pixel.

5. The display pipe of claim 3, wherein the underrun pixel is loaded into the register from system memory.

6. The display pipe of claim 1, wherein the pixels to be displayed on the display device by the display controller are stored in the buffer in a specified order, wherein the pixels are to be displayed on the display device by the display controller in the specified order.

7. The display pipe of claim 6, wherein in attempting to read, from the location in the buffer, pixels which are to be provided for display by the display controller but have not yet been written to the location in the buffer, the display controller is attempting to read a pixel that has not yet been written according to the specified order into the location in the output buffer.

8. A method for providing pixels to be displayed on a display device, the method comprising:
writing, into respective locations in a buffer, pixels to be displayed on a display device, comprising writing the pixels in a specified order;
reading pixels from the respective locations in the buffer in the specified order the pixels were written into the respective locations in the buffer; and
supplying to a display controller, from a location other than a respective location in the buffer, a proxy pixel to be displayed on the display device, wherein supplying the proxy pixel is in response to the reading comprising:
a read pointer to the buffer overtaking a position of a write pointer to the buffer, wherein the position of the read pointer overtaking the position of the write pointer comprises the read pointer pointing to a location in the buffer that has not yet been written with a new pixel value expected by the display controller;
wherein the read pointer points to a location in the buffer from where a pixel is currently being read and the write pointer points to a location in the buffer that is currently being filled.

9. The method of claim 8, further comprising:
providing a valid pixel to the display controller for displaying the valid pixel on the display device, responsive to the reading returning the valid pixel.

10. The method of claim 8, wherein supplying the proxy pixel comprises selecting the proxy pixel from a plurality of possible proxy pixels.

11. The method of claim 8, further comprising:
continuously supplying the proxy pixel to the display controller until the reading returns a valid pixel; and
subsequent to the reading returning the valid pixel, supplying the valid pixel to the display controller.

12. The method of claim 8, wherein the writing is performed at a first clock rate and the reading is performed at a second clock rate different from the first clock rate.

13. The method of claim 8, wherein supplying the proxy pixel to the display controller comprises supplying the proxy pixel from a register.

14. The method of claim 13, further comprising storing a most recently read valid pixel in the register;
   wherein supplying the proxy pixel from the register comprises supplying the most recently read valid pixel stored in the register.

15. A system comprising:
   a first-in-first-out (FIFO) buffer configured to store pixels to be displayed on a display device by a display controller;
   a processing circuit configured to write the pixels into the FIFO buffer at a first clock rate;
   a display controller configured to read the pixels from the FIFO buffer at a second clock rate different from the first clock rate;
   a register configured to store an underrun pixel; and
   selection logic circuitry configured to receive an indication of whether a currently read pixel is an invalid pixel or a valid pixel, and further configured to selectively provide to the display controller, based on the received indication:
      the underrun pixel from the register when the indication is that the currently read pixel is an invalid pixel; and
      the currently read pixel when the indication is that the currently read pixel is a valid pixel.

16. The system of claim 15, wherein the register is further configured to store the currently read pixel as the underrun pixel when the indication is that the currently read pixel is a valid pixel.

17. The system of claim 15, wherein the second clock rate corresponds to a screen refresh rate of the display device.

18. The system of claim 15, further comprising control circuitry configured to generate a control signal as the indication, and provide the control signal to the selection logic circuitry.

19. The system of claim 15, further comprising control circuitry configured to:
   make a determination whether the currently read pixel is an invalid pixel or a valid pixel based on:
      a location of the currently read pixel in the FIFO buffer; and
      a location in the FIFO buffer that was most recently written by the processing circuit; and
   generate the indication based on the determination.

20. The system of claim 15, further comprising control circuitry configured to:
   track:
      a read pointer pointing to a current read location in the FIFO buffer from where the display controller is attempting to read; and
      a write pointer pointing to a current write location in the FIFO buffer where the processing circuit is attempting to write; and
   detect when the display controller is attempting to read from a location in the FIFO buffer that does not contain a valid pixel, wherein to detect when the display controller is attempting to read from a location in the FIFO buffer that does not contain a valid pixel, the control circuitry is further configured to compare a value of the read pointer with a value of the write pointer.

* * * * *